Figure 5:
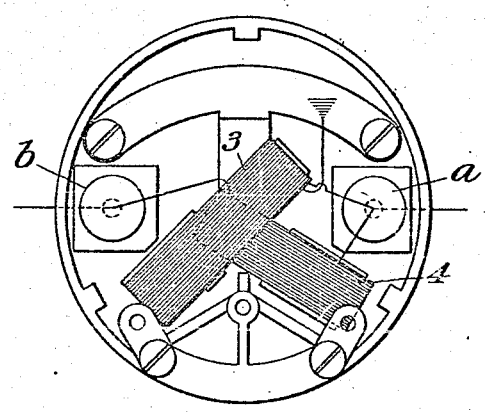

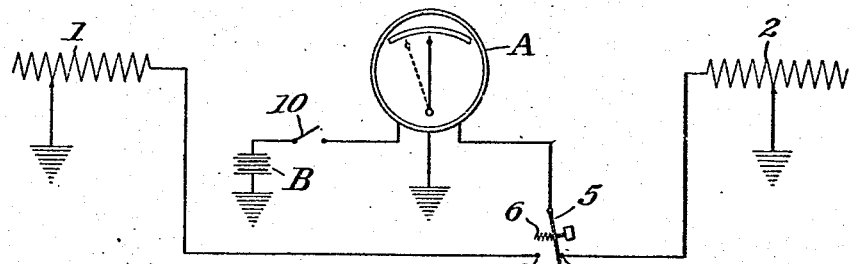

Dec. 15, 1931.    M. E. CHENEY    1,837,113
ELECTRICAL OIL AND GAS INDICATOR
Filed July 10, 1928    3 Sheets-Sheet 2

Inventor
Moses E. Cheney
By Attorney
Nathan P Bowman

Dec. 15, 1931.    M. E. CHENEY    1,837,113
ELECTRICAL OIL AND GAS INDICATOR
Filed July 10, 1928    3 Sheets-Sheet 3

Inventor
Moses E. Cheney
By Attorney
Nathan & Bowman

Patented Dec. 15, 1931

1,837,113

UNITED STATES PATENT OFFICE

MOSES E. CHENEY, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

ELECTRICAL OIL AND GAS INDICATOR

Application filed July 10, 1928. Serial No. 291,685.

This invention relates to a combined electric gasoline and oil gauge suitable for use with the conventional dial pointer indicator commonly used on motor cars. One main feature is that it is only necessary to employ the conventional gas indicator which becomes common to both oil and gasoline receptacles. Another important feature is that the parts are so arranged that this indicator will normally and continuously indicate the amount of gas in the gas receptacle, thereby meeting the standard requirement of a motor gas gauge, but at intervals which usually will be infrequent, indications of the amount of oil in the oil receptacle can be temporarily obtained from the same indicator, the character of the graduations on the dial being preferably unchanged from those commonly used on motor car gas gauges.

It is especially adapted for use on motor vehicles wherein oil and gas are carried in separate receptacles of different shapes and sizes positioned at some distance from the operator's seat, meeting the particular requirements which make it desirable for automobile use, it having been the established practise to graduate the dial of the commonly used gas gauge indicator with marks such as "Empty"; "Full"; ⅛; ¼; ½ and ¾. Obviously, graduated indicia marks only may be used as in Fig. 6.

The requirements of such a combined gas and oil device for motor car use which this invention has satisfied are the following:

*First.*—It is essential that the operator be able to connect and disconnect the indicator and receptacles with a quick and single movement of one hand, due to the exigencies of the situation. It will sometimes happen that, while the car is in motion, the operator will wish information as to the condition of the oil tank and it is therefore important that he be able to operate the controlling device by a quick and simple movement of one hand with a minimum of risk. He can keep the other hand on the steering wheel, and if the danger of a distraction is reduced to a minimum, the device will be accepted as practical for any average operator of a motor car.

*Second.*—Another requirement is that the arrangement be such that the operator of average intelligence cannot be mislead into reading the indicator as indicating the condition of the gas receptacle when in fact it is connected with the oil receptacle, there being preferably one set of dial graduations common to both tanks. It must be fool proof and under no circumstances must it fail to indicate continuously the liquid level of the gas in the gas receptacle except when the operator temporarily and intentionally causes the indicator to show a reading depicting oil level in the oil receptacle. In order to accomplish this desirable result, the controlling device must also be arranged to restore automatically the connections of the indicator with the gas receptacle immediately upon its release by the operator.

*Third.*—Another requirement is the matter of expense and simplicity. Obviously, the problem would have been simple if an additional indicator could have been placed on the cowl, but that would have been objectionable because of the expense involved. By reason of the limited space on the cowl for all the instruments that are now required for the modern car, it would also be objectionable to the car manufacturer to add another instrument to the equipment. Furthermore, as indicated above, it is desirable to employ a simple form of indicator having but one set of graduations.

*Fourth.*—To render a device of this kind suitable for automobile use it must also be susceptible of adaptation to tanks of radically different sizes and shapes; for it is well known that the tank for the gas is very different in size and shape from the oil tank and the empty and full positions of the floats are different. Consequently the extent of movement of one float operated actuating device, as disclosed in Fig. 2, may be greater or less than that of the other tank actuator.

Some of the other requirements have been met by placing in the line of vision of the operator both the indicator and the controlling device and positioning one in close proximity to the other. Then, the specific arrangement of the switch hereinafter described is especially adapted to meet the requirements of reducing to a minimum the danger of the operator becoming confused or distracted. It will hereafter become apparent that the operator need only give a quick glance at the switch and indicator; for a slight and single movement of one hand will disconnect the gas receptacle circuit, the indicator always telling him, by a jump or flicker of the pointer, that the connections have been disconnected and another jump or flutter of the indicator will also indicate when the oil receptacle circuit is closed and likewise when the gas receptacle connections are restored.

It will be seen that this invention provides a novel and felicitous arrangement of switch, indicator and circuits which permits the operator to secure a continuous reading of the liquid level of one receptacle, except when the selector switch is temporarily held long enough to enable the operator to determine the oil level of the other receptacle. All this can be done almost instantaneously with the minimum amount of distraction, by observing the pointer and one set of graduations, by a slight movement of one hand and without introducing any danger of confusing the gas and oil receptacle readings.

In the arrangement disclosed not only is the indicator common to both tanks, but there is only one battery employed and this common battery is the source of the current for both sets of instruments associated with the two tanks, and with the addition of simple selector switch mechanism, manually operated, the system becomes such that at any moment an indication can be obtained of the level of the oil in the oil receptacle on the same indicator dial as normally indicates the level of the gas or vice versa. Furthermore, the indicator will automatically be disconnected from the one receptacle and the connection to the other tank restored upon the release of the manually operated switch.

In cases where a plurality of gas and oil tanks are used, this single indicator and battery can be so connected with all the tanks that indications can be obtained as to the liquid level of any tank at any time. It is only necessary to employ on the indicator dial one set of graduations such as those commonly employed i. e. "Full"; "Empty"; ⅛; ¼; ½ and ¾ and the pointer will co-operate with those indications or with ordinary indicia gradautions whether the connections are made to the oil tank or to the gas tank as hereinafter fully explained to indicate "full", "empty" and all intermediate positions.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 6:
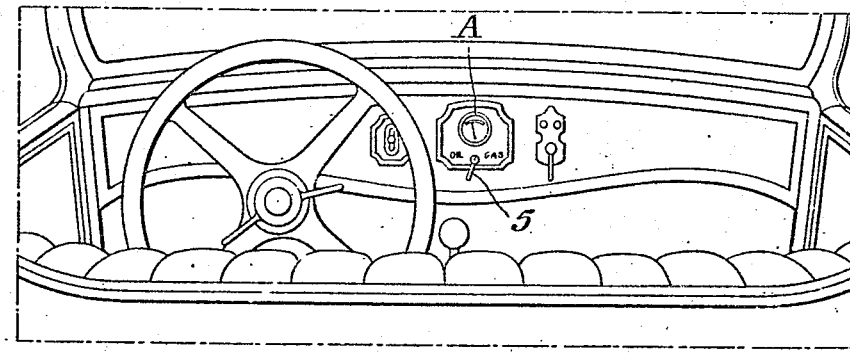
Figure 7:
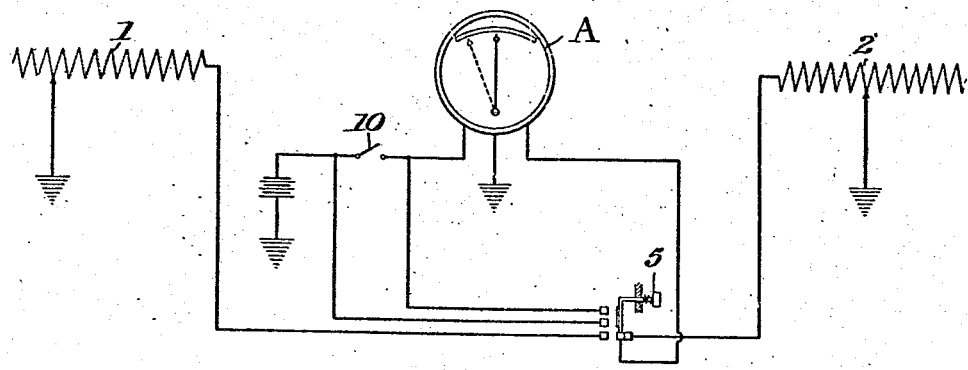
Figure 8:
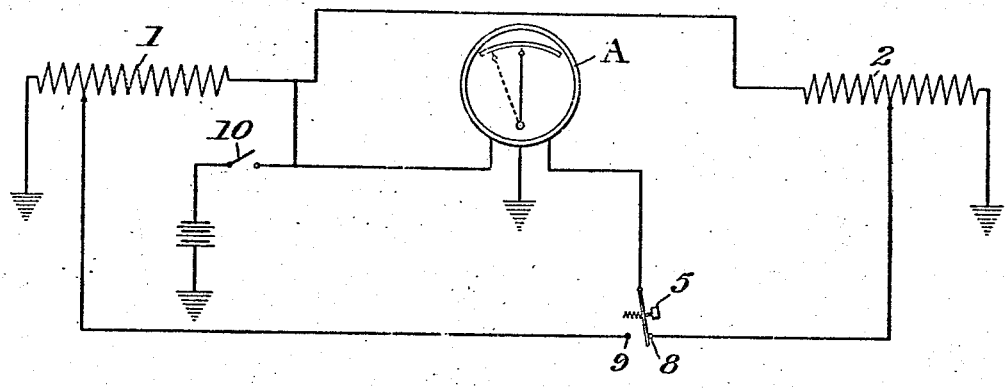

In the drawings Figure 1 is a diagrammatic view of the parts. Fig. 2 is a diagrammatic view of a system having four tanks and a manually operated switch capable of connecting the indicator to any one of the tanks. Fig. 3 is a diagrammatic view having two tanks in a two-wire circuit with said indicator; Fig. 4 is a modification of Fig. 3 and Fig. 8 is a further modified construction similar to Fig. 3. Fig. 5 is a detail view of the indicator mechanism, and Fig. 6 is a perspective view of the instrument board of a car wherein the switch 5 is held against its spring pressure. Fig. 7 discloses a circuit wherein the oil tank may be connected to the indicator with the ignition switch open.

In the drawings B indicates the battery or source of electric current and A indicates any ordinary instrument capable of indicating the current in the circuits to which it is connected and same is graduated in the usual way to indicate the condition of the tanks, such as "Full", "Empty" etc. The rheostats are marked 1 and 2, the rheostat for the oil tank being marked 1 and the rheostat for the gas tank being marked 2 and these rheostats are of the type now in general use with electric liquid level tanks, and it is only necessary to say that these rheostats are usually operated by floats or similar devices located within the tanks.

The indicator is of the differential galvanometer type comprising coils 3 and 4 (Fig. 5). The high side of battery B is connected to terminal $a$ and the rheostats are connected to terminal $b$, being in series with coil 4. The battery is grounded and coil 3 is likewise grounded (Fig. 5). In the two wire circuit arrangement there may be four terminals cooperating with the manual switch. The manually operated switch 5, which is spring pressed into normal position by the spring 6, may be mounted on the frame of the car at a point accessible to the operator of the car. Switch 5 is shown in Fig. 1 in normal position making contact with the terminal 8. The switch is normally disconnected from terminal 9 but this terminal 9 is brought into contact by depressing switch 5 and simultaneously terminal 8 is cut out of the circuit.

The wiring is preferably as shown in Fig. 1 wherein contact 8 is connected to the rheostat 2, both receptacles being grounded. Contact 9 is likewise connected to rheostat 1. The ignition switch is indicated by 10 and when that switch is closed with switch 5 in the position shown in Fig. 1 the rheostat 2 is in circuit with the indicating instrument A and the battery so that A will indicate the condition of the gas tank. By pushing switch inwardly and thereby bringing terminal 9 and switch 5 together, the rheostat 1 will be brought into circuit with the indicator and rheostat 2 disconnected therefrom. Consequently, the condition of the oil receptacle will be indicated on said instrument A so long as the operator holds the switch 5 out of its normal position but upon releasing same, contact will be automatically thrown back into contact with terminal 8. In this way the gas tank will be automatically brought back into the circuit with the battery and indicating instrument.

In Fig. 2 there are shown a plurality of gas tanks and oil receptacles with one indicator and one battery common to all the tanks. Rheostats are employed as in the other figures of the drawings. All the tanks are grounded. The terminal 9 is in circuit with the indicator and the terminal 10' is in circuit with gas tank 14, while terminal 11 is connected to tank 15, terminal 12 with 16 and 13 with 17. The selector switch 18 can be operated to bring any one of the tanks into circuit with the indicator, the switch being shown in position to close the line extending from the indicator to the gas tank 14.

As disclosed in Fig. 6 the selector switch 5 is preferably located on the instrument board of a motor car and the marks "Gas" and "Oil" indicate whether the selector switch is thrown to a position such that the indicator will indicate the level of the gas or oil.

Fig. 7 is a modified arrangement of Fig. 1 permitting an indication of the oil level with the ignition switch open.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. In a motor car characterized as having a panel adjacent the operator's seat and separate receptacles for gas and oil positioned at a point remote from said panel, the combination of float devices operated by the liquids in the receptacles, rheostats connected to said float devices, an indicator common to both of said receptacles positioned on said panel with a manually operated selector switch common to said receptacles and accessible to the operator's hand while sitting upon the seat of the car, and means for holding said switch in its normal position to cause continuous indications as to the position of the float in the gas tank but capable of being moved temporarily by a slight touch of the hand of the operator while sitting upon the seat of the car to a position such as to cause an indication of the level of said oil in its tank on said indicator, said parts being so arranged that the switch upon its release from the pressure of the operator's hand will return inevitably and automatically to said normal position whereby continuous indications will be given of said float device in said gas tank except when the switch is held out of normal position by the hand of the operator.

2. In an electrical indicating system, characterized as having an indicator common to a plurality of receptacles and electric circuits connecting said indicator with said receptacles and a source of current, the combination comprising an ignition switch capable of opening and closing the circuit connecting the source of current and one receptacle with said indicator, a selector switch common to all said receptacles and means for holding same in position normally to connect said indicator with said first mentioned receptacle whereby same will be connected with the source of current whenever said ignition switch is closed, said selector switch being capable of being moved to a position to connect temporarily said source of current and indicator with another of said receptacles with the ignition switch in open or closed position.

3. In an electrical indicating system for a motor car having a panel adjacent the driver's seat and separate receptacles for fuel and oil, floats in said receptacles, electric circuits, adjustable resistances in said circuits controlled by said floats, a battery for said circuits and an indicator and a switch mounted on said panel, said switch connecting said indicator in said circuits and being biased to normally connect said indicator in one circuit.

4. In a motor car characterized as having a panel adjacent the operator's seat and two separate receptacles for liquids positioned at points remote from said panel, the combination of mechanically variable devices operable by changes of condition in each of said receptacles, rheostats connected to said variable devices, an indicator common to both of said receptacles positioned on said panel with a manually operable selector switch common to said receptacles and accessible to the operator's hand while sitting upon the seat of the car, and means for holding said switch in its normal position to cause continuous indications as to the condition in one receptacle but capable of being moved temporarily by a slight touch of the hand of the operator while sitting upon the seat of the car to a position such as to cause an indication of the condition in the other receptacle on said indicator, said parts being so arranged that the switch upon its release from the pressure of the operator's hand will return inevitably and automatically to said normal position whereby continuous indications will be given of the condition in said first named receptacle except when the switch is held out of normal position by the hand of the operator.

5. In an electrical indicating system for a motor car having a panel adjacent the driver's seat and two separate receptables for liquids, mechanically variable devices operable by changes of condition in each receptacle, electric circuits, adjustable resistances in said circuits controlled by said variable devices, a battery for said circuits and an indicator and a switch mounted on said panel, said switch connecting said indicator in said circuits and being biased to normally connect said indicator in one circuit.

In witness whereof, I hereunto subscribe my name.

MOSES E. CHENEY.